(12) United States Patent
Everington

(10) Patent No.: US 9,717,234 B2
(45) Date of Patent: Aug. 1, 2017

(54) ANIMAL ATTRACTING SYSTEM AND METHOD

(71) Applicant: Charles Philip Everington, New Bern, NC (US)

(72) Inventor: Charles Philip Everington, New Bern, NC (US)

( * ) Notice: Subject to any disclaimer, the term of this patent is extended or adjusted under 35 U.S.C. 154(b) by 637 days.

(21) Appl. No.: 13/900,680

(22) Filed: May 23, 2013

(65) Prior Publication Data

US 2013/0326926 A1    Dec. 12, 2013

Related U.S. Application Data

(60) Provisional application No. 61/657,266, filed on Jun. 8, 2012.

(51) Int. Cl.
*A01M 31/06* (2006.01)

(52) U.S. Cl.
CPC .................................. *A01M 31/06* (2013.01)

(58) Field of Classification Search
CPC ................................ A01M 31/06; A01M 1/02
USPC .............................................................. 43/2
See application file for complete search history.

(56) References Cited

U.S. PATENT DOCUMENTS

| 6,532,693 | B2 | 3/2003 | Sides |
| 6,901,693 | B1 * | 6/2005 | Crowe ................................ 43/2 |
| 8,272,918 | B2 * | 9/2012 | Lam ........................ A63H 3/20 |
| | | | 446/330 |
| 2013/0247441 | A1 * | 9/2013 | Bellamy et al. ..................... 43/2 |
| 2013/0305586 | A1 * | 11/2013 | Forrester ............................. 43/2 |

OTHER PUBLICATIONS http://www.hydroponicsonline.com/store/itm_390334549989.html—Mar. 2, 2012.

* cited by examiner

*Primary Examiner* — Peter M Poon
*Assistant Examiner* — Jeffrey R Larsen
(74) *Attorney, Agent, or Firm* — Ward and Smith, P.A.; Ryan K. Simmons

(57) ABSTRACT

An animal attracting system and method is disclosed. The animal attracting system includes a moveable decoy and a remote control activation device. The moveable decoy provides a substantially realistic, lifelike appearance of an animal, such as a deer, and provides capability to substantially mimic the natural body movements of the animal, such as a deer. The moveable decoy includes a first motor for moving a tail portion of the moveable decoy, a second motor for rotating the body portion of the moveable decoy about a fixed mounting point, a controller for communicating with the remote control activation device and for actuating the first and second motors, and a power source.

14 Claims, 11 Drawing Sheets

ANIMAL ATTRACTING SYSTEM AND METHOD

CROSS REFERENCE TO RELATED APPLICATIONS

This application claims priority to and incorporates by reference U.S. Provisional Application Ser. No. 61/657,266 filed Jun. 8, 2012, entitled "Animal Attracting Device and Method," the disclosure of which is expressly incorporated by reference herein in its entirety.

FIELD OF THE INVENTION

The presently disclosed subject matter relates generally to animal decoys and more particularly to a moveable animal attracting system and method.

BACKGROUND OF THE INVENTION

Typically it is common to utilize decoys as a hunting aid when hunting certain types of animals, such as deer, bear, and turkeys. However, the effectiveness of decoys is often limited due to limitations in emulating appearance and natural movements of wild animals. For example, deer communicate by using certain body movement, such as movement of the tail in a back and forth motion or flipping of the tail up and down (flagging). Most animal decoys have no, or very limited, ability to move and emulate an animal's natural body movement. Therefore, such decoys do not always provide a realistic appearance since they are not capable of suitably emulating an animal's natural body movement and are often fixed in one position. Consequently, such decoys cannot mimic certain communications between the animals that would be advantageous in attracting an animal into closer range.

Further, certain decoys are inflatable, which is convenient for carrying and deploying. However, a drawback of inflatable decoys is that they are not very durable for the rugged environment in which, for example, a deer decoy is typically used. Additionally, inflatable decoys often do not provide a realistic lifelike appearance. For the aforementioned reasons, new approaches are needed for providing decoys that have a realistic lifelike appearance, that mimic an animal's natural body movements, and that are durable.

SUMMARY OF THE INVENTION

In one embodiment an animal attracting system is provided. The animal attracting system may include a moveable decoy, the moveable decoy may include a body portion having an inner chamber; a first moveable portion extending from one end of the body portion; a first motor coupled to the first moveable portion, and configured to move the moveable portion; a second motor coupled to the body portion and configured to move the body portion. The animal attracting system may further include a mounting system rotatably supporting the moveable decoy; and a remote control activation device, wherein the remote control activation device is preferably configured to actuate the first and second motors remotely. The mounting system may include a rod with a first end and a second end, the rod first end operably engaging with the second motor, the second motor configured to rotatably move the decoy upon actuation of the second motor, and wherein the rod second end is configured to engage a mounting surface. The animal first and second motors may be servo motors. The animal attracting device may further include at least one power source electrically connected to the first and second motors. The at least one power source may be a battery pack. The animal attracting device may further include at least one remote receiving/activation unit in communication with the first and second motors for actuation from a remote location. The rod may include a collapsible or a telescoping rod. The rod may be configured to engage the mounting surface such that the decoy does not contact the mounting surface. The first moveable portion may include a tail section. The first moveable portion may be detachable from the rear portion of the body portion. The animal attracting device may further include a scent pad attached to the body portion. The animal attracting device may further include one or more of a head section and leg sections. The body portion may be covered with an animal hide, which may be real, artificial, or a combination. The mounting surface may include one of a ground surface or a tree. The mounting system may further include an attachment mechanism for attachment to a tree.

In another embodiment a method of attracting animals is provided. The method of attracting animals may include, providing an animal attracting system, the animal attracting system may include a moveable decoy comprising, a body portion having an inner chamber; a first moveable portion extending from one end of the body portion; a first motor coupled to the first moveable portion, and configured to move the moveable portion; a second motor coupled to the body portion and configured to move the body portion; a mounting system rotatably supporting the moveable decoy; and a remote control activation device, wherein the remote control activation device is configured to actuate the first and second motors remotely. The method of attracting animals may further include, setting up the moveable decoy in a desired location; actuating the second motor to rotate the animal attracting device about the rod to properly align the animal attracting device with a desired direction; and actuating the first motor to move the first moveable portion upon the presence of an animal desired to be attracted in closer proximity.

BRIEF DESCRIPTION OF THE DRAWINGS

Figure 1:
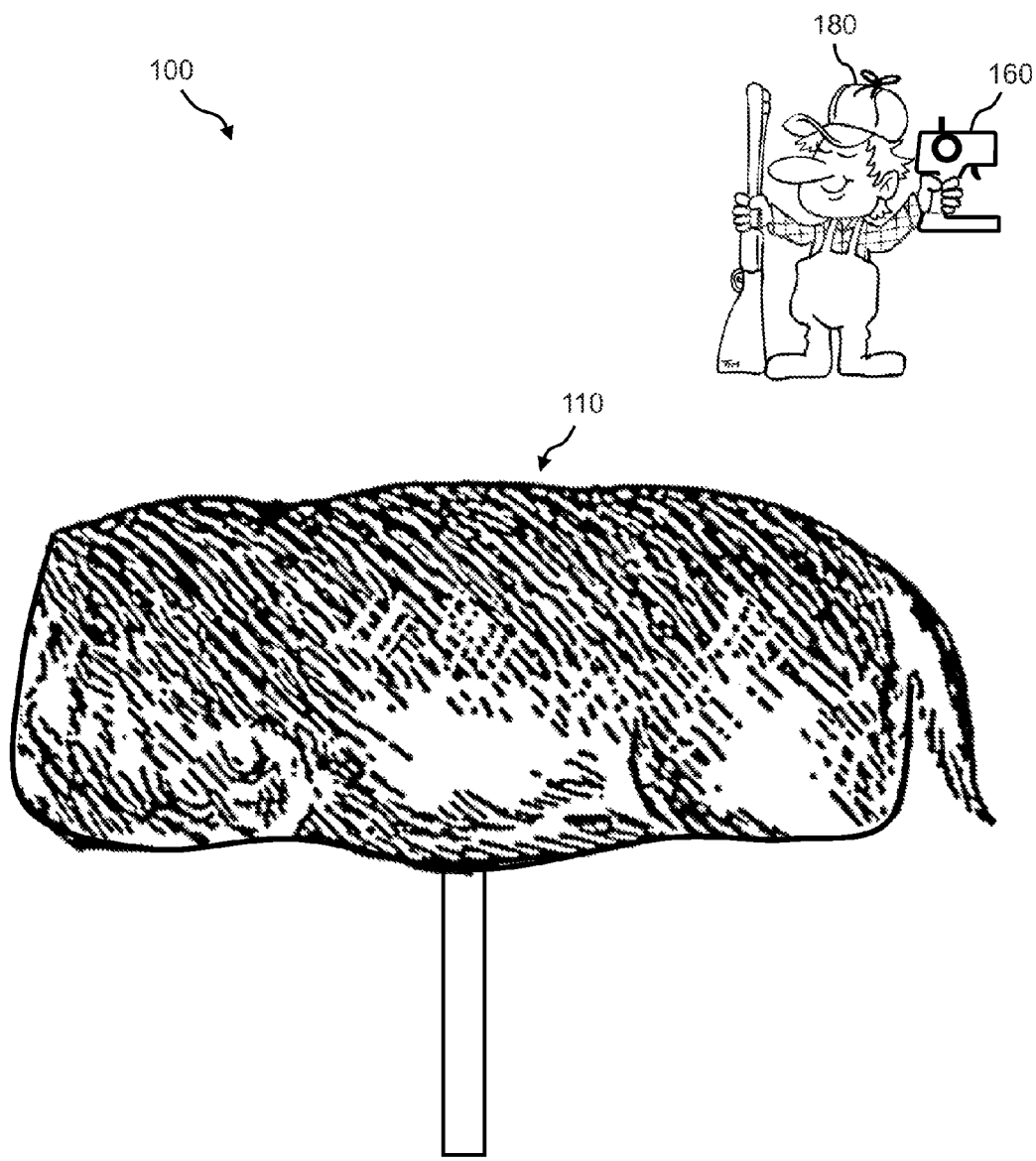
Figure 2:
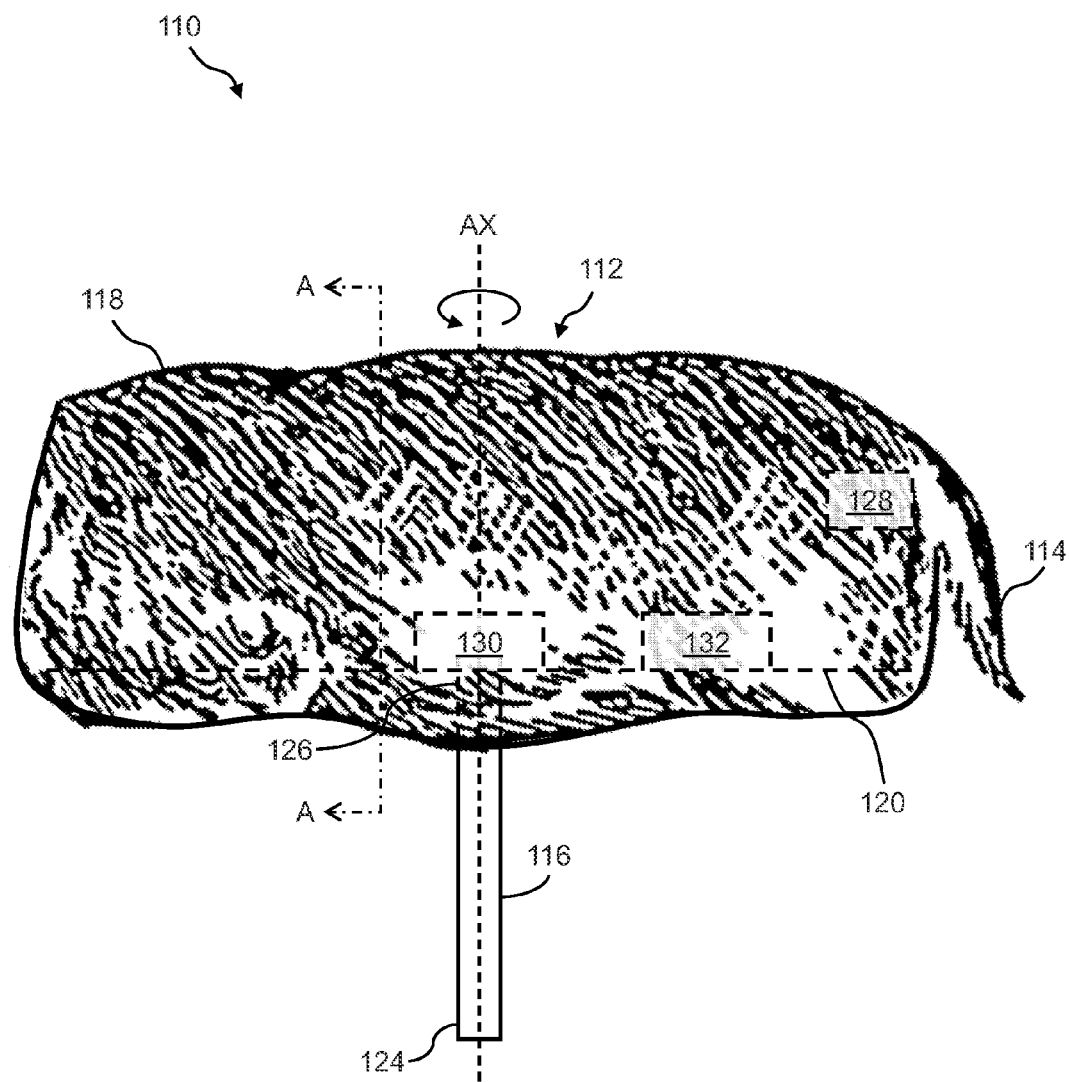
Figure 3:
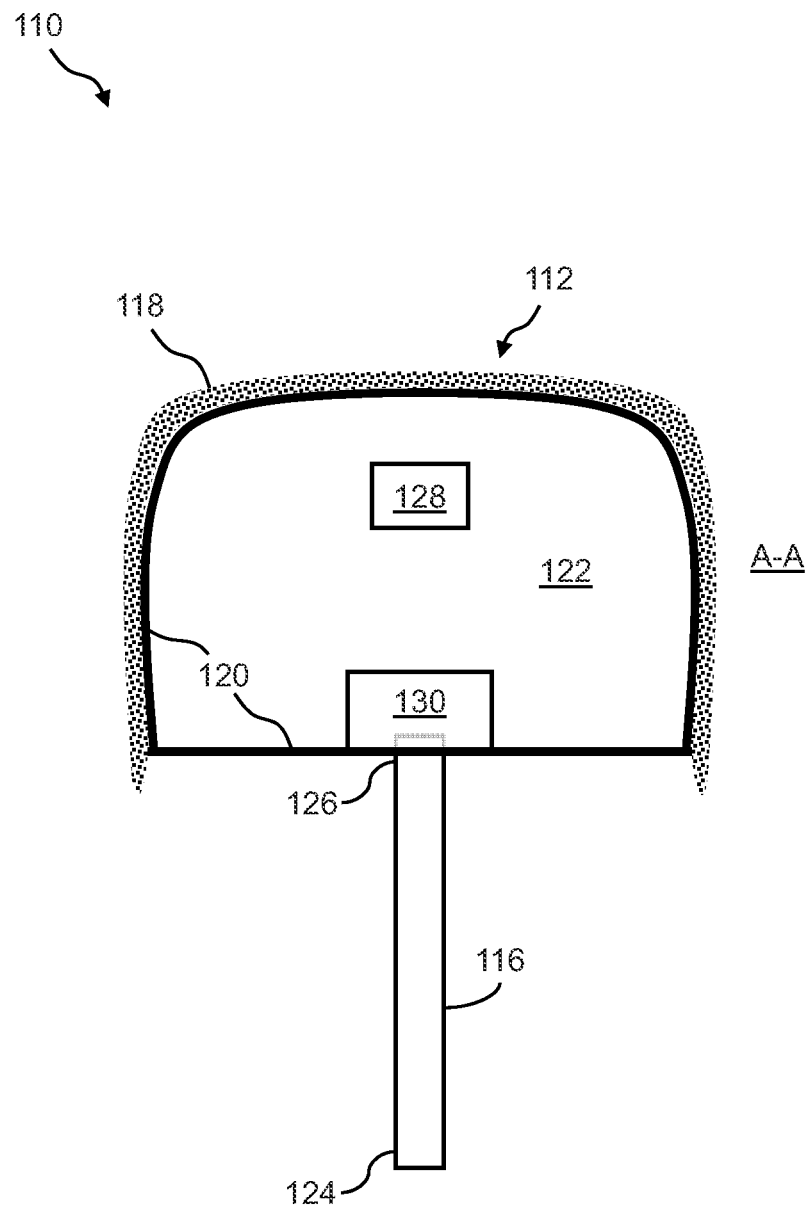
Figure 4:
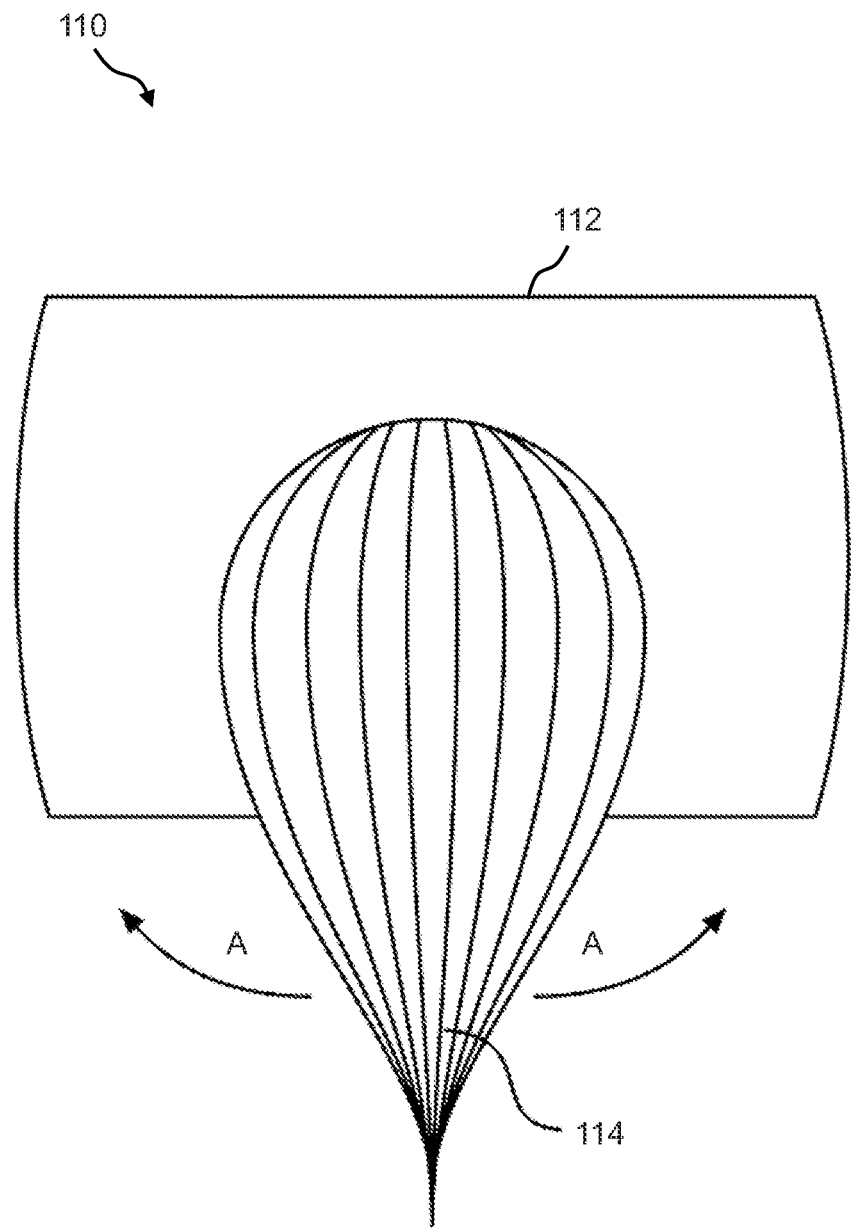
Figure 5:
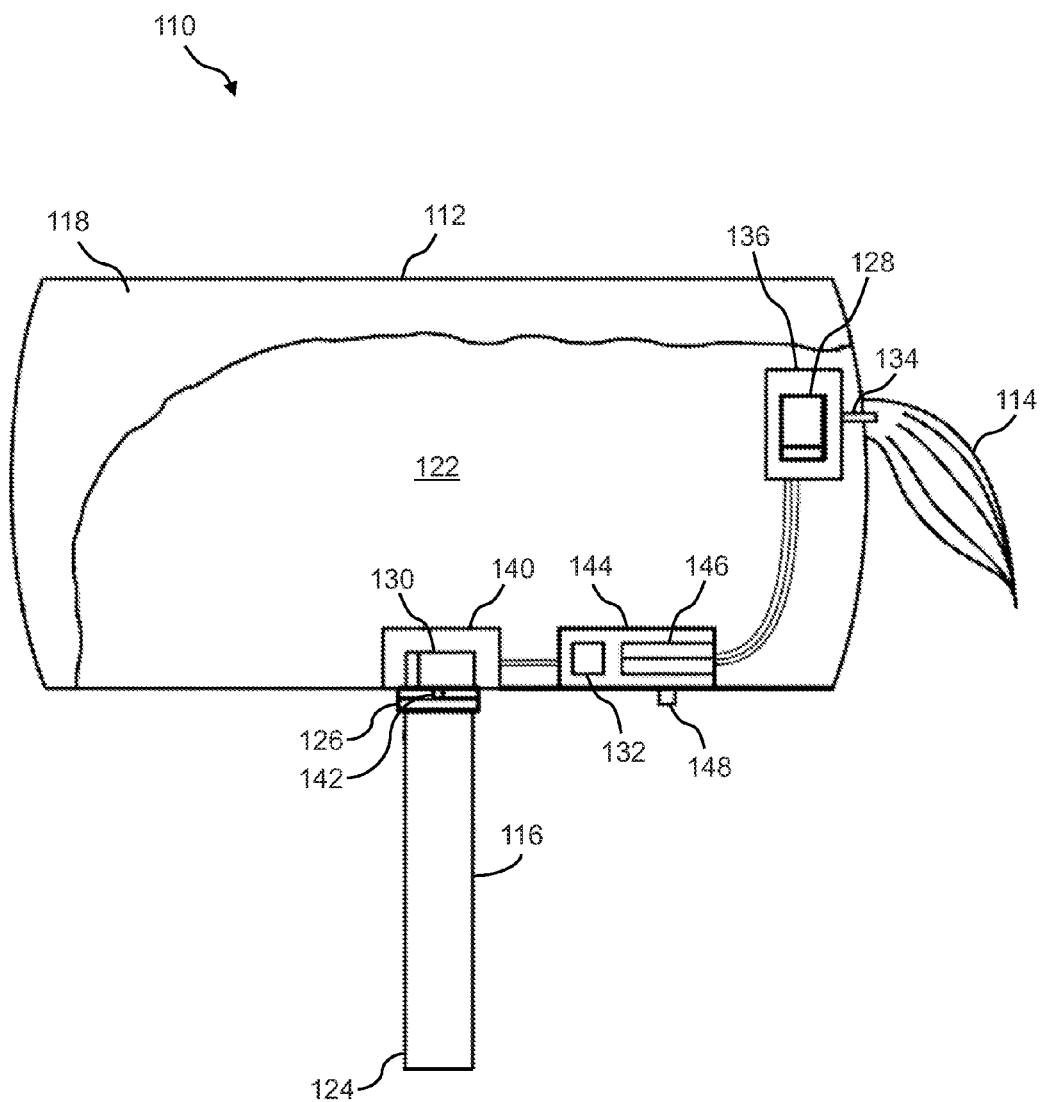
Figure 6:
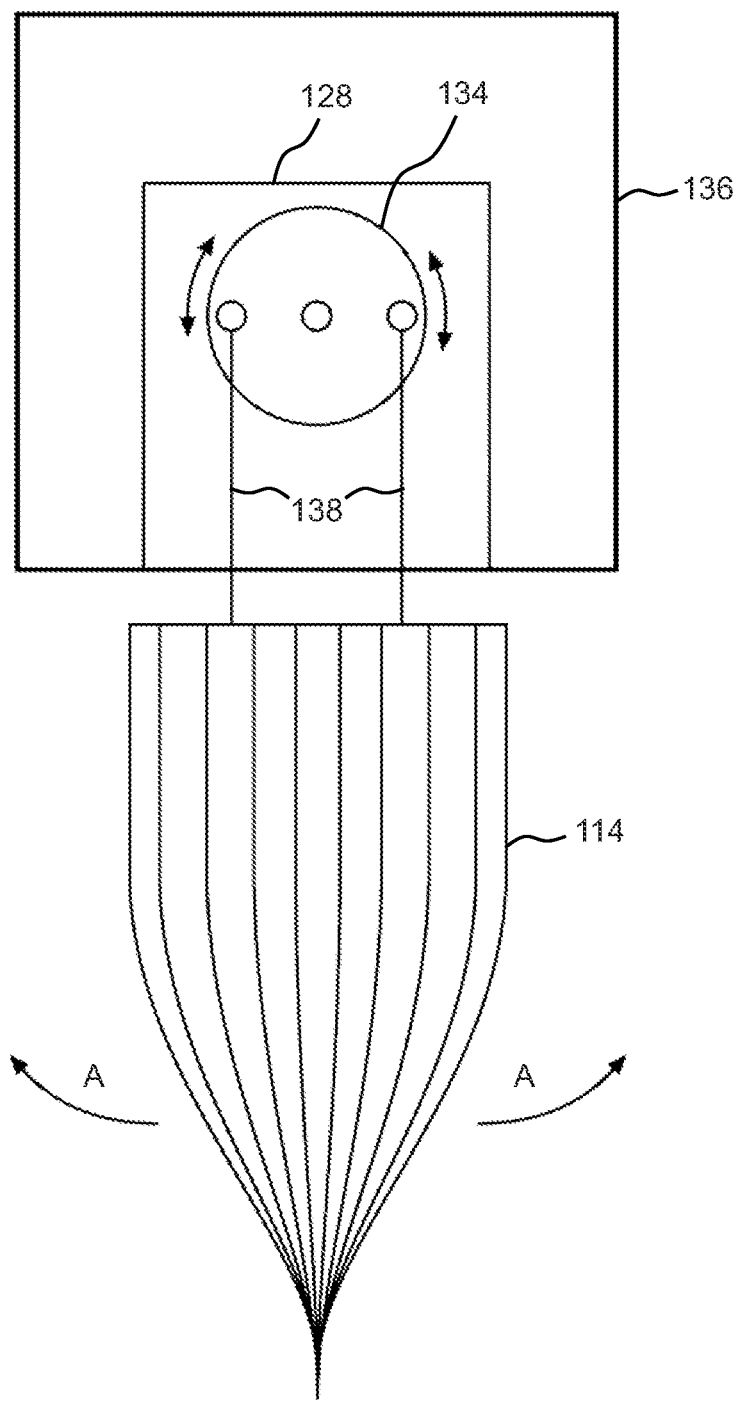
Figure 7:
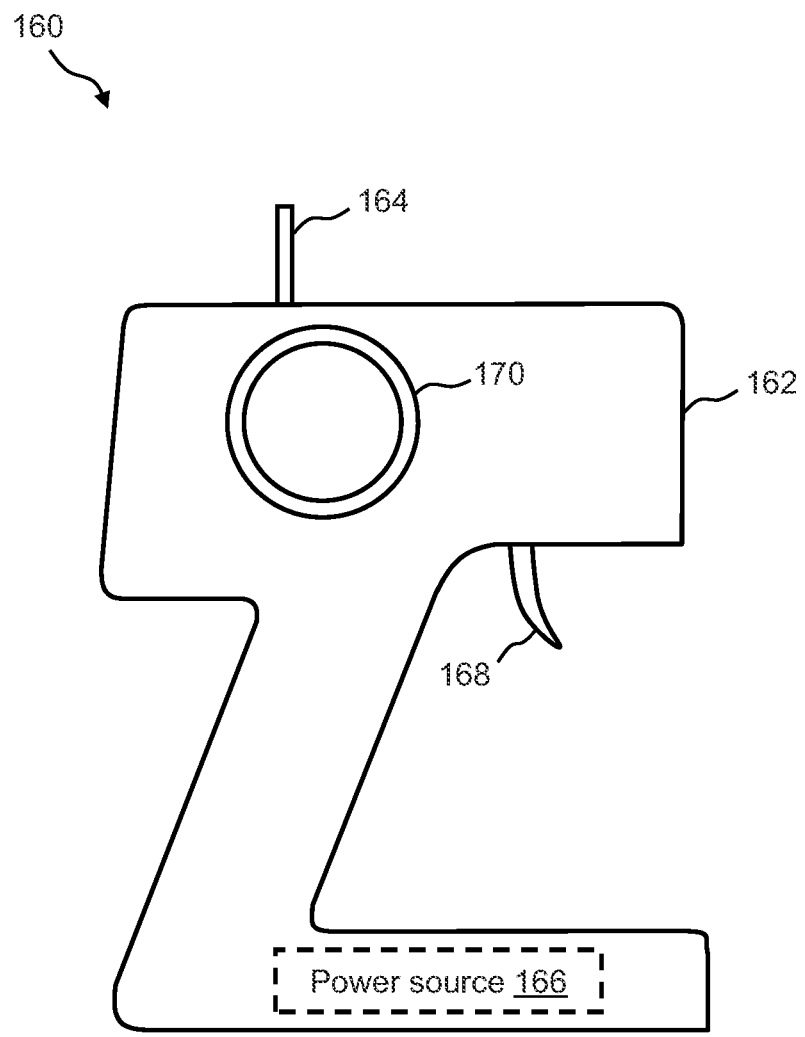
Figure 8:
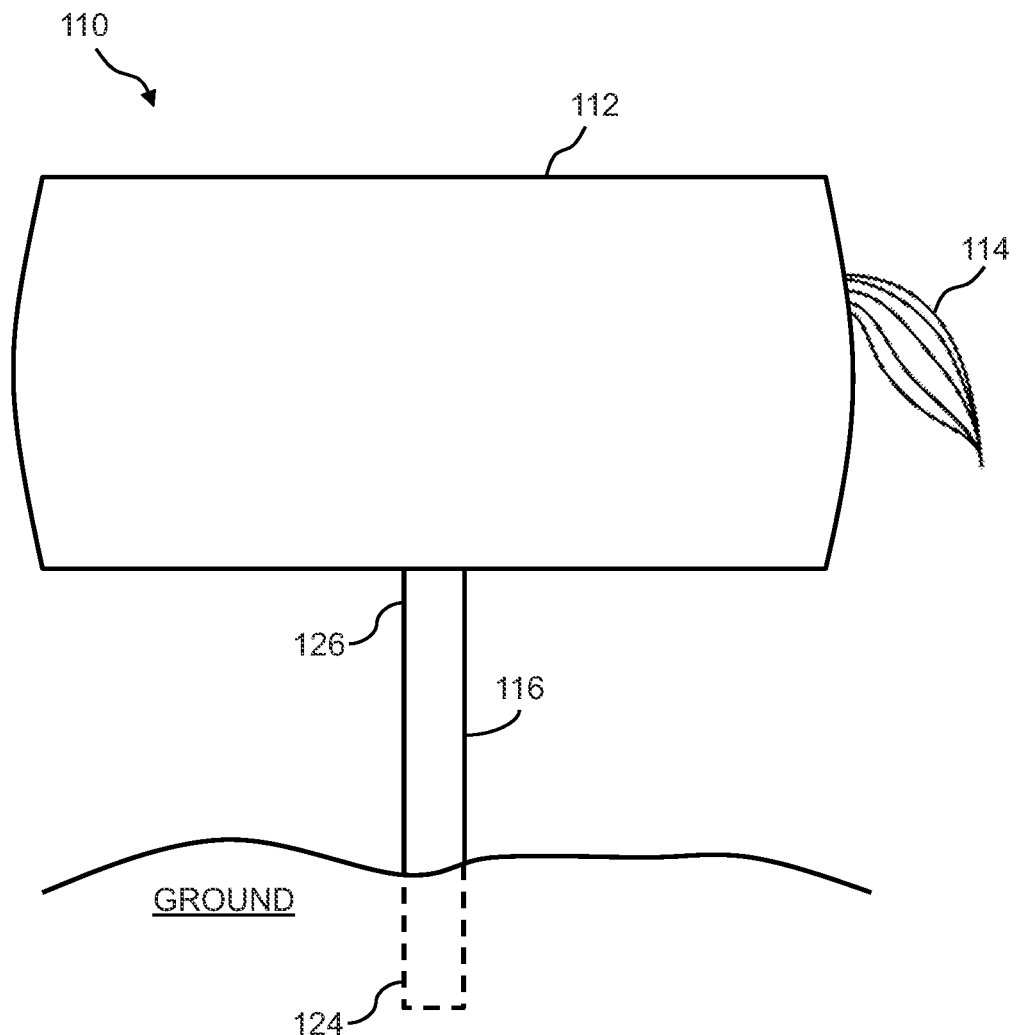
Figure 9:
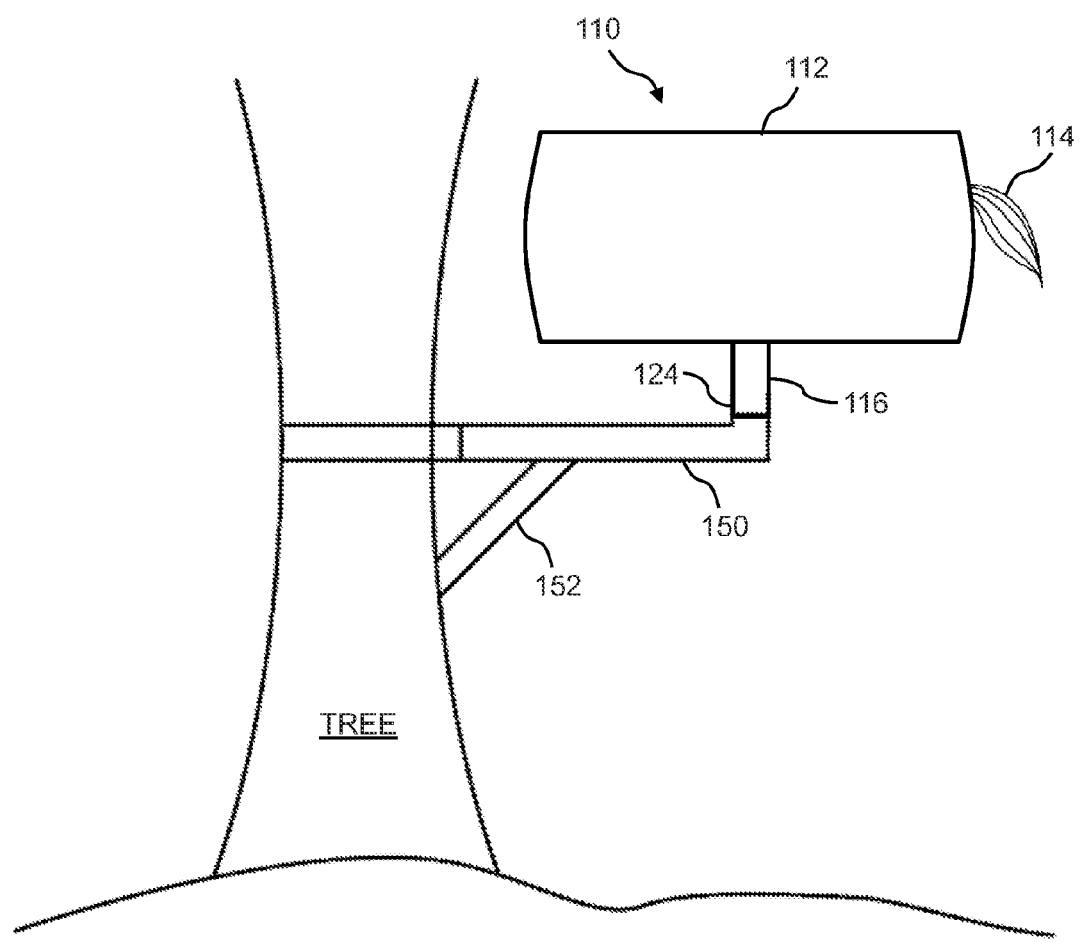
Figure 10:
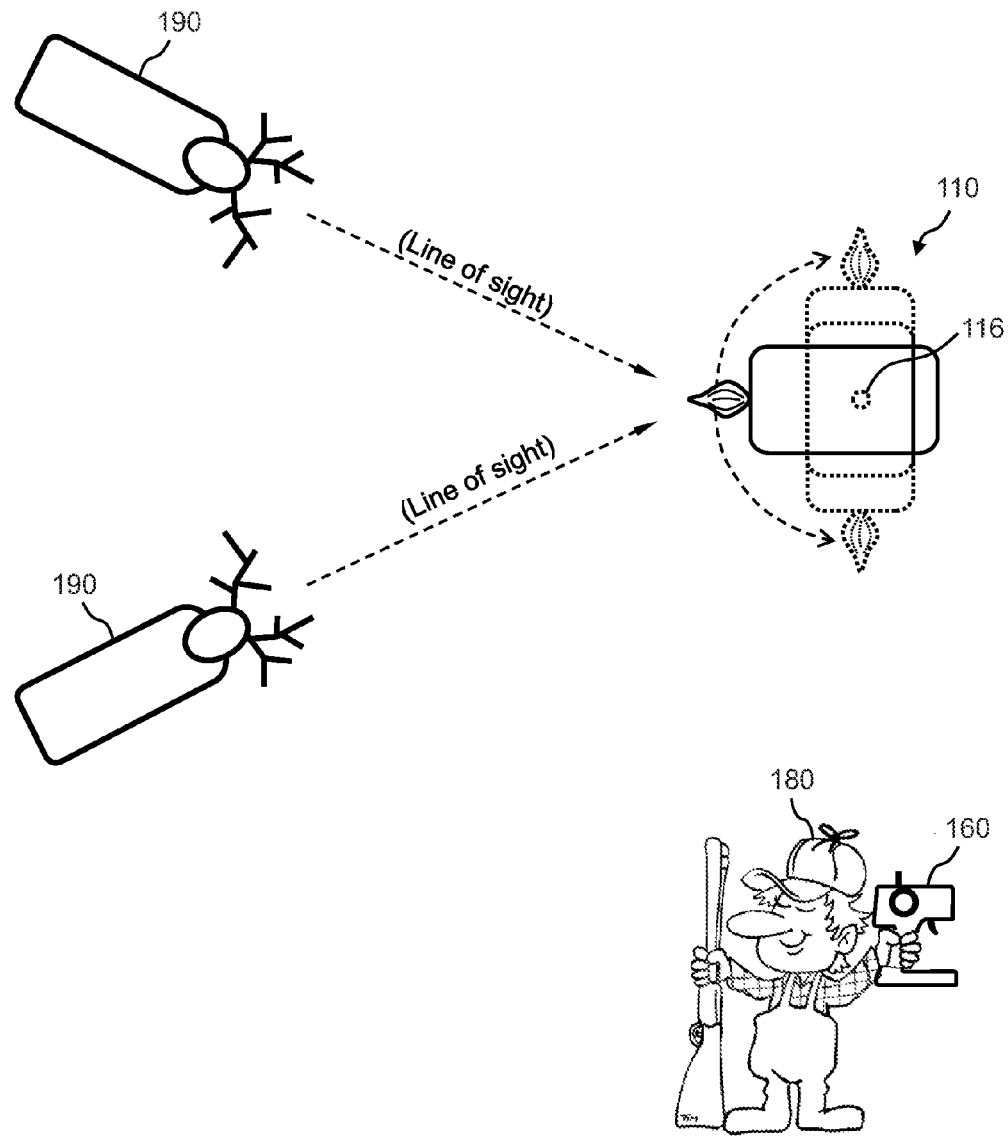
Figure 11:
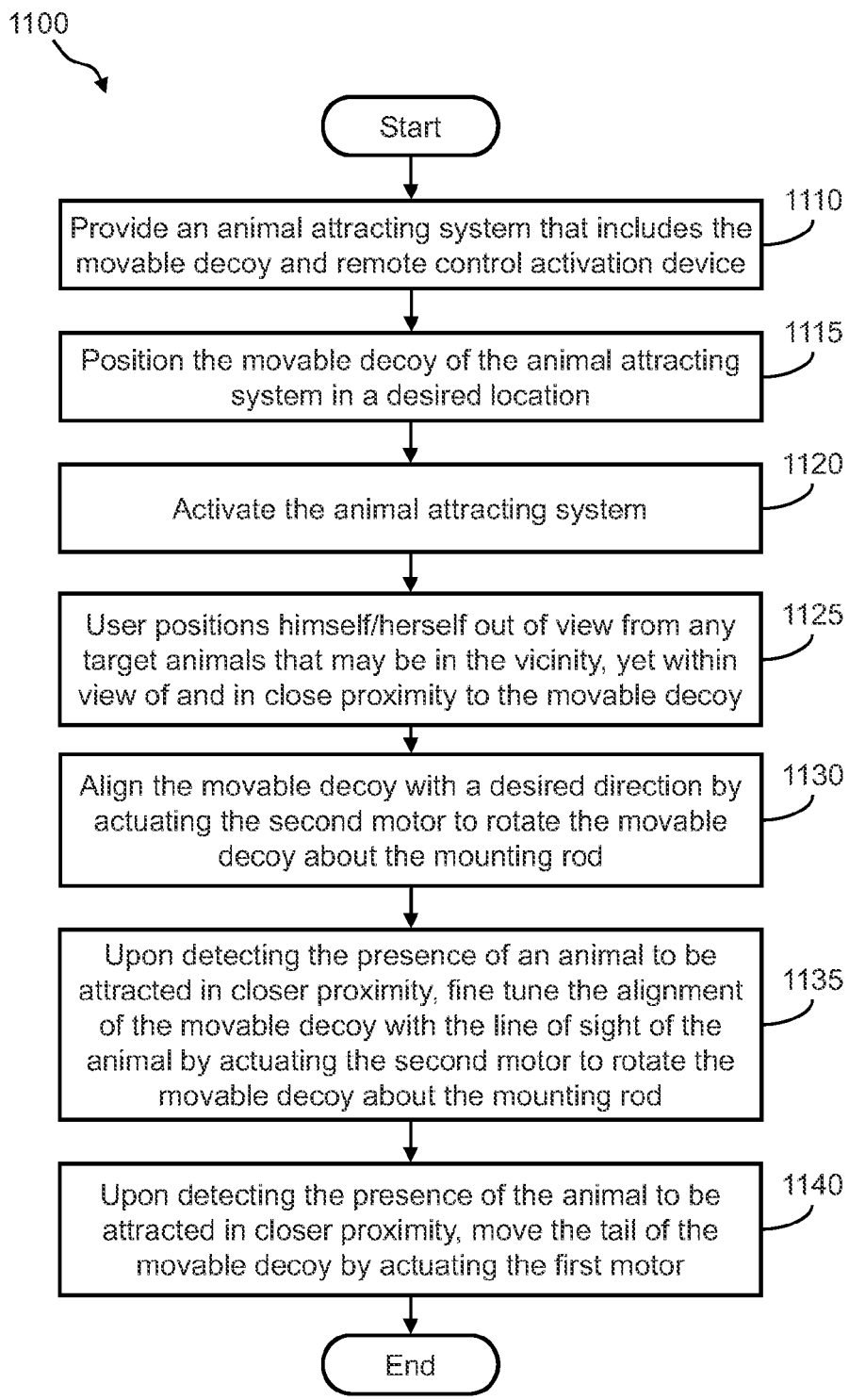

Having thus described the presently disclosed subject matter in general terms, reference will now be made to the accompanying Drawings, which are not necessarily drawn to scale, and wherein:

FIG. 1 illustrates a side view of an example of the presently disclosed animal attracting system, which includes a moveable decoy and a remote control activation device;

FIG. 2 and FIG. 3 illustrate a side view and a cross-sectional view, respectively of an example of the moveable decoy of the presently disclosed animal attracting system;

FIG. 4 illustrates an end view of the moveable decoy and shows more details of the moveable tail;

FIG. 5 illustrates a cutaway side view of the moveable decoy and shows more details of the internal operational components and electronics thereof;

FIG. 6 illustrates an end view of the moveable decoy and shows another example of the moveable tail;

FIG. 7 illustrates a side view of an example of the remote control activation device of the animal attracting system;

FIG. 8 shows a side view of the moveable decoy mounted to a mounting surface, such as the surface of the ground;

FIG. 9 shows a side view of the moveable decoy mounted to a tree;

FIG. 10 shows a plan view of an example of using the presently disclosed animal attracting system, and FIG. 11 illustrates a flow diagram of an example of a method of using the presently disclosed animal attracting system.

DETAILED DESCRIPTION OF THE INVENTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides an animal attracting system that is capable of emulating an animal's natural movement. The animal attracting system includes a decoy, such as a deer decoy, that is moveable on a mounting rod, and a remote control activation device. The moveable decoy preferably includes a body portion having an outer shell. The mounting rod rotatably supports the moveable decoy such that the decoy can rotate without contacting the mounting surface, such as the ground, a tree, or other mounting surface. The moveable decoy may also include one or more motors, for example two servo motors. The motors move moveable sections of the decoy upon actuation of the motors. The motors are preferably remote actuated, either wired or wireless. The invention may be used to attract various types of animals, both large and small, for example, but not limited to deer, bear, turkey, moose, elk, rabbit, squirrel, or any other animal. The animal attracting system is preferably capable of being assembled to mount on the ground, to a tree, or other suitable surface or structure.

More particularly, and in one embodiment, the animal attracting system is a moveable deer decoy mounted on a rod such that the moveable decoy does not contact the ground. A first motor is mounted in association with a tail section of the moveable decoy, such that the tail of the moveable decoy is moveable upon actuation of the first motor. The tail is preferably moveable in a side-to-side or back-and-forth motion. In addition, a second motor is associated with the mounting rod and body portion of the moveable decoy such that the moveable decoy is rotatable about the mounting rod upon actuation of the second motor. For example, the moveable decoy may rotate from about 0 degrees to about 180 degrees about the mounting rod, or up to 360 degrees. The moveable decoy is thus able to rotate about the mounting rod as a result of actuation of the second motor.

The animal attracting system and method will be described in more detail below with reference to FIG. 1 through FIG. 11. FIG. 1 illustrates a side view of an example of the presently disclosed animal attracting system 100. The animal attracting system 100 includes a moveable decoy 110, which is a moveable decoy about a fixed mounting point, and a remote control activation device 160. A user 180 is associated with the animal attracting system 100, wherein the user 180 uses the remote control activation device 160 to operate the moveable decoy 110. In the example shown in FIG. 1, the moveable decoy 110 of the animal attracting system 100 is a moveable deer decoy device. Namely, in FIG. 1, the moveable decoy 110 provides a substantially realistic, lifelike appearance of a deer and provides capability to substantially mimic the natural body movements of a deer. However, the animal attracting system 100 is not limited to a moveable deer decoy 110. The moveable deer decoy 110 is exemplary only. The animal attracting system 100 can include a moveable decoy 110 of any type of animal, such as, but not limited to, a deer, a bear, a turkey, a moose, a rabbit, a squirrel, and the like. More details of the moveable decoy 110 are shown and described with reference to FIG. 2 through FIG. 6. More details of the remote control activation device 160 are shown and described with reference to FIG. 7.

FIG. 2 and FIG. 3 illustrate a side view and a cross-sectional view, respectively of the of the moveable decoy 110 of the animal attracting system 100, wherein FIG. 3 illustrates a cross-sectional view of the moveable decoy 110 taken along line A-A of FIG. 2. In this example, the moveable decoy 110 is a moveable deer decoy that includes a body portion 112 and a tail 114 that extends from one end of the body portion 112, wherein the tail 114 is moveable. The body portion 112 of the moveable decoy 110 is supported by a mounting rod 116.

The body portion 112 is formed of an outer shell 118 that is fitted around a frame 120. In one example, the frame 120 can be a system of wooden or fiberglass struts and/or supports that are arranged and/or shaped to mimic the body shape of an animal, such as a deer. In another example, the frame 120 has a unibody type of construction that mimics the body shape of an animal, such as a deer. The unibody may be fabricated or molded from plastic, aluminum, or any other suitably durable material. The outer shell 118 is, for example, a natural or artificial animal hide, such as a deer hide that is shown in FIG. 2.

An inner chamber 122 is formed inside of the frame 120. The inner chamber 122 is preferably waterproof to protect the internal operational components and electronics of the moveable decoy 110, whereas the internal operational components and electronics are housed in inner chamber 122.

The moveable decoy 110 may include a first motor 128 that is mechanically coupled to the tail 114. The first motor 128 is preferably installed inside the inner chamber 122 of the body portion 112 of the moveable decoy 110. The first motor 128 is used to move the tail 114 in a side-to-side or back-and-forth motion, which is shown in FIG. 4 by the directional arrows A. Namely, FIG. 4 shows an end view of the body portion 112 of the moveable decoy 110 from which the tail 114 extends. More details of the first motor 128 are shown and described with reference to FIG. 5.

The body portion 112 of the moveable decoy 110 is designed to swivel or rotate about a center axis of rotation (AX) with respect to the mounting rod 116, as shown in FIG. 2. Namely, the mounting rod 116 has a first end 124 and a second end 126. The body portion 112 of the moveable decoy 110 is rotatably coupled to the second end 126 of the mounting rod 116. A second motor 130 is preferably installed inside the inner chamber 122 of the body portion 112 of the moveable decoy 110 for controlling the rotation of the body portion 112 on the second end 126 of the mounting rod 116. More details of the second motor 130 are shown and described with reference to FIG. 5.

Referring again to FIG. 2, a controller 132 may also be installed inside the inner chamber 122 of the body portion 112 of the moveable decoy 110. The controller 132 may be used to control the operations of the first motor 128 for moving the tail 114. Additionally, the controller 132 may be used to control the operations of the second motor 130 for rotating the body portion 112 of the moveable decoy 110 on the mounting rod 116. Using the controller 132, both the first motor 128 and the second motor 130 can be actuated remotely, wherein the first motor 128 and the second motor 130 can be actuated independently. More details of the controller 132 are shown and described with reference to FIG. 5.

Accordingly, the animal attracting system 100 includes the remote control activation device 160, which is a handheld remote control device, and may be wired or wireless. The remote control activation device 160 is used by the user 180 to control the rotation of the body portion 112 of the moveable decoy 110 and to control the side-to-side movement of the tail 114 of the moveable decoy 110.

FIG. 5 illustrates a cutaway side view of the moveable decoy 110 and shows more details of the internal operational components and electronics thereof. For example, the tail 114 may be mechanically coupled to the first motor 128 via a shaft 134 extending from the inner chamber 122. The first motor 128 may be contained in a motor housing 136, such as a plastic housing. In one example, the first motor 128 is a small servo motor, which is well known in the art. The first motor 128 may include shaft 134 connected to tail 114. In one example, the shaft 134 is connected to tail 114 directly. However, in another example and referring now to FIG. 6, the shaft 134 is connected to the tail 114 using an actuation member(s) 138 that the first motor 128 reciprocates or rotates. In yet another example, the tail 114 is detachable; namely, the tail 114 may be connected exteriorly to the body portion 112 of the moveable decoy 110 and be detachable from the body portion 112.

With continuing reference to FIG. 5, the mounting rod 116 may be formed of plastic, metal, fiberglass, wood, or any other suitable material. The second end 126 of the mounting rod 116 engages with the second motor 130, which is mounted to the frame 120 inside of the inner chamber 122 of the body portion 112 of the moveable decoy 110. Again, the mounting rod 116 rotatably supports the body portion 112 of the moveable decoy 110, such that the body portion 112 is rotatable about the center axis of rotation (AX) with respect to the mounting rod 116. The second motor 130, in a similar fashion as that of the first motor 128, is preferably contained in a motor housing 140, such as a plastic housing. The second motor 130 may include a shaft 142 operably engaged with the second end 126 of the mounting rod 116. In one embodiment, the second motor 130 is a servo motor which is well known in the art. In one example, the shaft 142 is configured to engage the second end 126 of the mounting rod 116. In an alternative embodiment, the shaft 142 is operably connected to the second end 126 of the mounting rod 116 using an actuation member (not shown) that the second motor 130 reciprocates or rotates.

With continuing reference to FIG. 5, the first motor 128 and the second motor 130 are preferably operably connected to the controller 132, wherein the controller 132 is a remote receiving/activation unit. The controller 132 is used to actuate the first motor 128 and the second motor 130 from a remote location via the remote control activation device 160. Namely, the controller 132 may include an antenna (not shown) and may have a wireless communication link with the remote control activation device 160. The first motor 128 and the second motor 130 can be actuated independently. Remote activation of motors is well known in the art. The controller 132 can have a wired or wireless communication link with the first motor 128 and the second motor 130.

The controller 132 may be installed in a housing 144, such as a plastic housing. Also installed in the housing 144 may be a power source 146, such as a battery pack. The power source 146 is electrically connected to the controller 132, the first motor 128, and the second motor 130 and therefore supplies power thereto. In this example, the first motor 128 and the second motor 130 are connected to a common power source (e.g., power source 146) and to a common controller (e.g., controller 132). However, in another example, the first motor 128 and the second motor 130 may be connected to separate power sources and/or to separate controllers, wherein the separate controllers are both in communication with the remote control activation device 160.

The moveable decoy 110 may further include an ON/OFF switch 148, which is installed on the housing 144. The ON/OFF switch 148 is preferably located on the underside of the body portion 112 of the moveable decoy 110 and is conveniently accessible by the user 180 to turn the animal attracting system 100 on and/or off.

Referring now to FIG. 7, the remote control activation device 160 of the animal attracting system 100 can be any standard handheld remote control device, which is well known in the art. The remote control activation device 160 may include a housing or body 162 (e.g., a plastic housing), an antenna 164, a power source 166 (e.g., batteries), and certain actuation controls, such as, but not limited to, a trigger control 168 and a pushbutton/rotary control 170. The remote control activation device 160 is used to activate remotely the second motor 130 and the first motor 128 of the moveable decoy 110. Namely, to rotate the body portion 112 of the moveable decoy 110 with respect to the mounting rod 116 and/or to move the tail 114 side-to-side or back-and-forth. For example, the trigger control 168 may be used to move the tail 114 and the pushbutton/rotary control 170 may be used to move the body portion 112 of the moveable decoy 110, or vice versa, wherein the tail 114 and the body portion 112 of the moveable decoy 110 can be moved independently. The remote control activation device 160 may be in wireless or wired communication with moveable decoy 110

FIG. 8 and FIG. 9 show two examples of mounting the moveable decoy 110 when using the animal attracting system 100. Namely, FIG. 8 shows the moveable decoy 110 mounted to a mounting surface, such as the surface of the ground. In this example, the first end 124 of the mounting rod 116 is inserted into the ground. The mounting rod 116 may include a flange (not shown) in proximity to its first end 124, wherein a flange a (not shown) may be provided on the mounting rod 116, and be configured to allow a user (e.g., user 180) to more easily drive the first end 124 of the mounting rod 116 securely into the ground. For example, the user 180 places his/her foot on the flange and pushes down. In another example, the first end 124 of the mounting rod 116 may include a tripod or quad-pod base (not shown) for engaging a ground surface to support the moveable decoy 110 while in use.

Referring now to FIG. 9, the moveable decoy 110 may be mounted to a tree. Namely, FIG. 9 shows the first end 124 of the mounting rod 116 fitted within an attachment mechanism 150 that is attached to a tree, wherein the attachment mechanism 150 is capable of engaging the first end 124 of the mounting rod 116 to support the moveable decoy 110. The attachment mechanism 150 may further include a support bracket 152.

The mounting rod 116 may be a unitary member or a collapsible rod that includes multiple segments held together with a stretchable cord, or telescopic segments, or locking mechanisms. The mounting rod 116 is positioned such that the moveable decoy 110 is spaced a distance from the ground (in FIG. 8) or from the attachment mechanism 150 (in FIG. 9) allowing the moveable decoy 110 to rotate about the mounting rod 116 upon actuation of the second motor 130, wherein the second motor 130 may be actuated remotely. In one example, the moveable decoy 110 may be rotated from about 0 degrees to about 360 degrees about the center axis of rotation (AX) with respect to the mounting rod 116.

FIG. 10 shows a plan view of the animal attracting system 100 in use. Namely, the moveable decoy 110 is mounted in a location in the habitat of the target animals to be attracted. For example, in the case of a moveable deer decoy 110, the moveable deer decoy 110 may be mounted at the edge of a field that is frequented by, for example, deer 190. The user 180 that is holding the remote control activation device 160 positions himself/herself in a location that is hidden from the view of the deer 190, but is in view of the moveable deer decoy 110. Upon detecting the presence of at least one deer 190, the user 180 uses the remote control activation device 160 to rotate the body portion 112 of the moveable deer decoy 110 such that the tail 114 is visually aligned with the distant deer 190. Then, the user 180 uses the remote control activation device 160 to move the tail 114 back-and-forth in an effort to attract the deer 190 to move in close proximity of the moveable deer decoy 110. More details of a method of using the animal attracting system 100 are described with reference to FIG. 11 below.

FIG. 11 illustrates a flow diagram of an example of a method 1100 of using the animal attracting system 100 to attract animals. Method 1100 may include, but is not limited to, the following steps.

At a step 1110, the animal attracting system 100 that includes the moveable decoy 110 and the remote control activation device 160 is provided to, for example, the user 180, wherein the user 180 may be a hunter.

At a step 1115, the moveable decoy 110 of the animal attracting system 100 is mounted and positioned in a desired location. For example, in the case of a moveable deer decoy 110, the moveable deer decoy 110 may be positioned and mounted at the edge of a field that is frequented by, for example, the deer 190 shown in FIG. 10. The moveable deer decoy 110 can be mounted, for example, according to FIG. 8 or FIG. 9.

At a step 1120, the user 180 activates the animal attracting system 100 using the ON/OFF switch 148 on the moveable decoy 110.

At a step 1125, the user 180 positions himself/herself out of view from any target animals that may be in the vicinity, yet within view of and in close proximity to the moveable decoy 110. The user 180 is holding the remote control activation device 160.

At a step 1130, using the remote control activation device 160, the user 180 aligns the moveable decoy 110 with a desired direction by actuating the second motor 130 to rotate the body portion 112 of the moveable decoy 110 about the mounting rod 116. For example, the user 180 may position the moveable decoy 110 having the tail 114 pointed toward the open field.

At a step 1135, upon detecting the presence of an animal (e.g., deer 190 shown in FIG. 10) to be attracted in closer proximity to the moveable decoy 110, the user 180 uses the remote control activation device 160 to fine tune the alignment of the moveable decoy 110 with the line of sight of the animal (e.g., deer 190) by actuating the second motor 130 to rotate the body portion 112 of the moveable decoy 110 about the mounting rod 116 such that the tail 114 is visually aligned with the distant animal (e.g., deer 190).

At a step 1140, upon detecting the presence of an animal (e.g., deer 190 shown in FIG. 10) to be attracted in closer proximity to the moveable decoy 110, the user 180 uses the remote control activation device 160 to move the tail 114 of the moveable decoy 110 by actuating the first motor 128. Additionally, the user 180 may use an animal call, such as a grunt call or the like, to get the animal's attention. The user 180 actuates the first motor 128 to cause the tail 114 to move in a side-to-side fashion, which emulates the natural movement of the animal, such as deer 190. The side-to-side motion of a deer tail is a communication method between deer to indicate that there is no threat or danger in the area. Therefore, by moving the tail 114 in a side-to-side fashion it emulates the natural movement of the deer and communicates to a distant deer that there is no threat in the area, thus, drawing the deer closer to the moveable decoy 110, which is also closer to the user 180.

Other Variations of the Animal Attracting System 100

The animal attracting system 100, in the case of a moveable deer decoy 110, may further include a deer head (with or without antlers), legs, and/or feet. Although moveable decoy 110 is illustrated as a deer in the figures, it is to be understood that moveable decoy 110 could be any type of animal. The moveable decoy 110 can be sized and shaped according to the type of animal.

Additionally, the tail 114 may include a rigid member that extends substantially the length of the tail 114. The rigid member may be attached to the shaft 134 of the first motor 128 and facilitates movement of the tail 114 upon movement of the shaft 134.

The animal attracting system 100 may further include a scent pad (not shown) configured for attachment to the moveable decoy 110. In one example, the scent pad is attached to the tail 114, such that when the first motor 128 is actuated and moves the tail 114 the scent pad moves through the air to improve release of the scent. The scent pad may include various scents, such as buck urine or doe urine. The scent pad may be attached using a hook and pile fastener, adhesive, snaps, buttons, pins, or other suitable methods.

The animal attracting system 100 may further include a carry bag, such as a duffel bag, of a size and shape to accommodate the animal attracting system 100 for easy transport and storage. The carry bag is preferably a blaze, or hunter's orange color for safety in transporting the animal attracting system 100 in and out of the woods.

While the invention has been described in terms of various specific embodiments, those skilled in the art will recognize that the invention can be practiced with modification within the spirit and scope of the claims.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

What is claimed is:

1. A moveable animal decoy system comprising:
   a. a body portion;
   b. a moveable tail portion attached to a rear portion of the body portion;
   c. a first motor coupled to the moveable tail portion, wherein the moveable tail portion comprises:
      i. a moveable member, wherein the moveable member is coupled to the first motor at about a center portion of the moveable member, and wherein the movable member pivots about the center portion;
      ii. a tail member; and
      iii. linkage arms having first and second ends, wherein the linkage arms are vertically orientated and positioned parallel to one another along their entire length, and wherein the first ends of the linkage arms are connected to opposing portions of the moveable member and the second ends of the linkage arms are connected to an upper portion of the tail member; and;
   d. a second motor coupled to the body portion and configured to move the body portion;
   e. a mounting system rotatably supporting the moveable decoy; and
   f. a remote control activation device, wherein the remote control activation device is configured to actuate the first and second motors remotely.

2. The moveable animal decoy system of claim 1 wherein the mounting system comprises a rod with a first end and a second end, the rod first end operably engaging with the second motor, the second motor configured to rotatably move the moveable decoy upon actuation of the second motor, and wherein the rod second end is configured to engage a mounting surface.

3. The moveable animal decoy system of claim 1 wherein the first and second motors comprise servo motors.

4. The moveable animal decoy system of claim 1 further comprising at least one power source electrically connected to the first and second motors.

5. The moveable animal decoy system of claim 4 wherein the at least one power source comprises a battery pack.

6. The moveable animal decoy system of claim 2 wherein the rod comprises one of a collapsible or a telescoping rod.

7. The moveable animal decoy system of claim 2 wherein the rod is configured to engage the mounting surface such that the moveable decoy does not contact the mounting surface.

8. The moveable animal decoy system of claim 1 wherein the moveable tail portion is detachable from the rear portion of the body portion.

9. The moveable animal decoy system of claim 1 wherein the moveable decoy further comprises a scent pad attached to the body portion.

10. The moveable animal decoy system of claim 1 wherein the moveable decoy further comprises one or more of a head section and leg sections.

11. The moveable animal decoy system of claim 1 wherein the body portion is covered with one of a natural or artificial animal hide.

12. The moveable animal decoy system of claim 1 wherein the mounting system is configured to mount to a mounting surface comprising one of a ground surface or a tree.

13. The moveable animal decoy system of claim 12 wherein the mounting system further comprises an attachment mechanism for attachment to a tree.

14. A method of attracting animals, comprising:
   a. providing a moveable animal decoy system, comprising: a body portion; a moveable tail portion attached to a rear portion of the body portion; a first motor coupled to the moveable tail portion, wherein the moveable tail portion comprises:
      i. a moveable member, wherein the moveable member is coupled to the first motor at about a center portion of the moveable member, and wherein the movable member pivots about the center portion;
      ii. a tail member; and
      iii. linkage arms having first and second ends, wherein the linkage arms are vertically orientated and positioned parallel to one another along their entire length, and wherein the first ends of the linkage arms are connected to opposing portions of the moveable member and the second ends of the linkage arms are connected to an upper portion of the tail member; and
   a second motor coupled to the body portion and configured to move the body portion; a mounting system rotatably supporting the moveable decoy; and a remote control activation device, wherein the remote control activation device is configured to actuate the first and second motors remotely;
b. setting up the moveable decoy in a desired location;
c. actuating the second motor to rotate the animal attracting device about the mounting system to properly align the animal attracting device with a desired direction; and
d. actuating the first motor to move the moveable tail portion to attract an animal into closer proximity.

* * * * *